United States Patent [19]
Lenke et al.

[11] Patent Number: 5,468,831
[45] Date of Patent: Nov. 21, 1995

[54] ONE-PACKAGE STRUCTURAL ADHESIVE

[75] Inventors: Gerd M. Lenke, Canton; H. William Cocain, Cuyahoga Falls, both of Ohio

[73] Assignee: GenCorp Inc., Fairlawn, Ohio

[21] Appl. No.: 171,944

[22] Filed: Dec. 21, 1993

[51] Int. Cl.[6] .................................................. C08G 18/00
[52] U.S. Cl. .................... 528/44; 528/59; 528/61; 528/62; 528/65; 528/85; 528/905; 428/423.7
[58] Field of Search .................... 528/44, 59, 61, 528/62, 65, 85, 905; 428/423.7

[56] References Cited

U.S. PATENT DOCUMENTS

| | | | |
|---|---|---|---|
| 3,645,924 | 2/1972 | Woiciech | 260/2.5 |
| 3,726,835 | 4/1973 | Bertozzi | 260/75 |
| 3,734,868 | 5/1973 | Uelzmann et al. | 260/2.5 |
| 3,740,377 | 6/1973 | Huffman et al. | 260/75 |
| 3,864,313 | 2/1975 | Susman | 260/75 |
| 4,876,308 | 10/1989 | Melby et al. | 524/780 |
| 5,175,228 | 12/1992 | Wang et al. | 528/48 |

OTHER PUBLICATIONS

A World Patent Index computer based search from 1966–1992 comprising 21 entries.
A Chem. Abst. search from 1967–May 1991 limited to English and German on One Componet/Package Adhesives comprising 18 entries+40 entries+7 entries of 17 possible entries+3 entries+10 entires+6 entries+25 entries.

Primary Examiner—James J. Seidleck
Assistant Examiner—Duc Truong
Attorney, Agent, or Firm—Robert F. Rywalski; Samuel B. Laferty

[57] ABSTRACT

A one-package primerless structural adhesive is disclosed that is particularly well suited for adhering one or more substrates of fiber-reinforced plastics. This adhesive uses dicyandiamide, its substituted derivatives, or melamine as the principal curative. A polyisocyanate prepolymer is made from various polyols reacted with polyisocyanates. In the absence of moisture, the curative and polyisocyanate can coexist in a single package without reacting for periods of time in excess of four months. Upon heating the adhesive to 150° C., it cures in about five minutes or less, forming an initial structural bond that after heat aging is often stronger than the cohesive strength of the fiber reinforced substrate.

19 Claims, 3 Drawing Sheets

ONE-PACKAGE STRUCTURAL ADHESIVE

FIELD OF INVENTION

The present invention relates to one-package polyurethane-based adhesive compositions having high NCO:OH equivalent ratios in the prepolymer component and which are cured with powdered curatives selected from dicyandiamide, substituted dicyandiamide or melamine. The product has a shelf life of in excess of four months and is used on fiber-reinforced plastic substrates.

BACKGROUND

Polyurethane adhesives have been popular for adhering fiber-reinforced plastic substrates to each other and to other objects such as metal fasteners and brackets due to the desirable chemical, heat, and aging resistance of crosslinked polyurethanes. These polyurethanes are specially formulated to have high tensile strength and to resist accelerated aging during painting and oven baking cycles to which the fiber-reinforced substrates are exposed.

Advances in the adhesives occurred with U.S. Pat. No. 3,714,127, to Fabris et al., who disclosed primary polyamines give desirable flow characteristics to the composition so that beads of the adhesive do not run off when applied to vertical surfaces. U.S. Pat. No. 4,876,308 to Melby et al. disclosed that high equivalent ratio of NCO:OH in the prepolymer of from 2 to 20 and a high equivalent ratio of NCO:(OH+NH) in the final adhesive. These higher NCO:(OH+NH) ratios eliminated the need for priming or pretreatment of fiber-reinforced plastic substrates.

Compositions similar to the above-cited patents were used commercially. They were two-component adhesives and the stoichiometry of the reactive species was important to the properties of the adhesives. Metered mixing equipment was needed near the application site to meter and mix the adhesive. The viscosity was controlled by the faster reaction of the isocyanates with the amines forming urea linkages.

It is the object of this invention to prepare a tough one-package polyurethane based structural adhesive composition that solidifies in five minutes or less at 300° F., having high adhesion to molded thermoset fiber reinforced plastic substrates, high cohesive strengths and which does not release volatiles during curing, such as organic solvents and/or blocking agents. These structural adhesives differ from molding compositions by having high cohesive and adhesive strengths.

SUMMARY OF THE INVENTION

A one-package solventless and primerless structural adhesive is disclosed which uses polyurethane prepolymers and powdered curatives selected from dicyandiamide (also known as DICY or cyanoguanidine), substituted dicyandiamides, and melamine. A high NCO:OH equivalent ratio of 15 to 30 is desirable in the prepolymer to achieve high adhesive strength to fiberglass reinforced thermoset plastics. The powdered curatives must be reduced to small particle sizes (as later defined) or less desirable physical properties are produced. The one-package adhesive does not release volatiles (solvents, blocking agents or the like) during curing, has a shelf life in excess of three months, when stored in the absence of moisture, and desirably cures in five minutes or less at about 300° F. (150° C.).

BRIEF DESCRIPTION OF DRAWINGS

A differential scanning calorimetry scan from 300° to 600° K. of the uncured formulation 12 is shown in FIG. 1. A cure exotherm exists starting at 140° C. and peaking at 180° C. The heating rate was 20° C. min.

A thermogravimetric analysis (TGA) of from 25° to 500° C. of a cured adhesive of this invention using 7.5 parts of DICY powdered curative per 100 parts polyurethane prepolymer is shown in FIG. 2. This scan shows that insubstantial weight loss in air occurs up to 250° C., which implies the adhesive has good thermal stability.

A dynamic mechanical thermal analysis (DMTA) scan between −100° and 200° C. for an adhesive composition of this invention is shown in FIG. 3. The log of the storage modulus is the solid line and the left axis, while the tan δ is the broken line and the right axis. The sample dimensions were 3.258×4.619×12 mm, mounted in single cantilever style, strain of x2, frequency of 1 Hz, with a heating rate of 2° C. per minute.

DETAILED DESCRIPTION OF THE INVENTION

A one-package polyurethane-based adhesive composition which is suitable for structurally bonding fiber reinforced plastic parts (FRP) to each other or to other substrates without the need for surface pretreatments (mechanical, solvent, or chemical primer) is described. Other substrates may be other plastics, metals, or ceramics. The adhesive composition is comprised of a prepolymer component and curative component.

The dicyandiamide (DICY, also known as cyanoguanidine) curative, in very small particle sizes such as at least 98 wt. % less than 10 μm in diameter, and at least 98 wt. % less than 6 μm in diameter is available from SKW Trostberg in Germany or from its U.S. subsidiary, SKW Chemicals, Inc. in Marietta, Ga. Accordingly, at least 98 wt. % of the particles are less than 25 μm, desirably less than 15 μm, and preferably less than 10 μm in diameter. These smaller size dicyandiamide particles are suitable curatives for the one-component adhesive. Melamine and various mono or di alkyl and/or phenyl substituted dicyandiamide materials with similar particle sizes are also useful. As the particle size is shown in Table I, to affect the cure rate and percent cohesive failure, it is asserted that prior publications did not disclose or realize the importance of small particle sizes. Presumably, much coarser materials were used in prior art U.S. Pat. Nos. 3,864,313 and 3,726,835, as the cure times reported therein were substantially longer at comparable temperatures.

Experiments with a 95–97 percent pure powdered dicyandiamide (DICY) having 98 wt. % of the dicyandiamide particles of diameters <40 μm gave slow but acceptable cure rates at 150° C. The adhesive properties of these compositions were unacceptable as shown in Table II. It was found that smaller particle size DICY (98%<10 μm) gave faster cure rates and better adhesive properties. This was attributed to the more uniform dispersion of the DICY in the composition. A significant excess of the diisocyanate such as an NCO:(NH) ratio of 1.2 or above or 1.4 or above in the final adhesive was also found to increase the cure rate with this curative and improve adhesion properties of the cured composition. The NH in the preceding equation may be NH or NH$_2$. A high NCO:OH ratio in the prepolymer was found to improve the cohesive strength of the adhesive. Further formulation work resulted in a one-component adhesive having appropriate viscosity, adhesion, and cohesive strength.

The prepolymer is comprised of a polyol intermediate and an excess amount of polyisocyanate so that free isocyanate groups exist in the prepolymer. Desirably, the ratio of isocyanate groups (NCO) to hydroxyl groups (OH) in the prepolymer components is from about 2 to 30 or 40, and more desirably from about 10 to 28 or 30, and preferably from about 15 to 26. The excess NCO groups will be located at the ends of the prepolymer chains and as unreacted polyisocyanates. Typically, the reaction to form the prepolymer takes place in the presence of one or more mineral fillers.

The polyol intermediate is generally a liquid polyether polyol or a polyester polyol, or combinations thereof having a number average molecular weight of from about 400 to about 10,000 with from about 2,000 to about 8,000 being preferred. A wide range of polyether or polyester polyols can be used in making the adhesives of the present invention such as diols, triols, tetrols, and the like. Triols are desirable as they give good cohesive strength. Polyether polyols are generally made by reacting an alkylene oxide having from 2 to 10 carbon atoms and preferably 1 to 3 carbon atoms, such as propylene oxide with a strong base, such as potassium hydroxide, preferably in the presence of water, glycols and so forth. Polyethers having a highly branched chain are readily prepared from alkylene oxides and initiators, said initiators having an active hydrogen functionality greater than 2. The higher functionality initiators that are useful with the alkylene oxides to make polyether polyols described above include polyols, polyamines and amino alcohols having a total of three or more reactive hydrogen atoms on hydroxyl and primary or secondary amino groups and generally having up to 12 carbon atoms.

Suitable polyols include triols, such as glycerol, trimethylolpropane, butanetriols, hexanetriols, trialkanolamines, various tetrols, such as erythritol and pentaerythritol; pentols and hexols, such as dipentaerythritol and sorbitol; as well as alkyl glucosides, carbohydrates, polyhydroxy fatty acid esters such as castor oil; and polyoxy alkylated derivatives or polyfunctional compounds having three or more reactive hydrogen atoms, such as, the reaction product of trimethylolpropane, glycerol and other polyols with ethylene oxide, propylene oxide or other epoxides or copolymers thereof, e.g., copolymers of ethylene and propylene oxides, with ethylene oxide being used in a molar amount of 20 mol percent or less as compared to other alkylene oxides such as propylene oxide. Examples of higher functional amino alcohols and polyamines include ethanolamine, diethanolamine, triethanolamine, isopropanolamine, diisopropanolamine, triisopropanolamine, 2-(2-aminoethylamino)ethanol, 2-amino-2(hydroxymethyl)-1,3-propanediol, ethylenediamine, diethylenetriamine, triethylenetetramine, and urea as well as various aryl polyamines such as 4,4',4"-methylidynetrianiline.

Other polyethers which can be utilized are those which are produced as by polymerization of tetrahydrofuran or epoxides (such as ethylene oxide, propylene oxide, butylene oxide, styrene oxide, or epichlorohydrin), or by addition of epoxide compounds (preferably ethylene oxide or propylene oxide), alone, in a mixture, or in succession, to starting components with reactive hydrogen atoms such as water, polyhydric alcohols, ammonia or polyfunctional amines.

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include the following: ethylene glycol, propylene glycol such as 1,2-propylene glycol and 1,3-propylene glycol, glycerol; pentaerythritol; trimethylolpropane; 1,4,6-octanetriol; butanediol; pentanediol; hexanediol; dodecanediol; octanediol; chloropentanediol, glycerol monoallyl ether; glycerol monoethyl ether, diethylene glycol; 2-ethylhexanediol-1,4; cyclohexanediol- 1,4; 1,2,6-hexanetriol; 1,3,5-hexanetriol; 1,3-bis-(2-hydroxyethoxy)propane and the like. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3'-thiodipropionic acid; succinic acid; adipic acid; malonic acid, glutaric acid, pimelic acid, sebacic acid, cyclohexane-1,2-dicarboxylic acid; 1,4-cyclohexadiene-1,2-dicarboxylic acid; 3-methyl-3,5-cyclohexadiene-1,2-dicarboxylic acid and their corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms. Any polyhydric alcohol having more than 2 hydroxyl groups or any polycarboxylic acid having more than 2 carboxylic groups used to make the polyesters should be used in only very minor amounts to prevent crosslinking and gelling.

Polyesters from lactones (for example ε-caprolactone), polyacetals, polycarbonates or polybutadienes containing terminal hydroxyl groups are also suitable for use as the polyols.

Preferred polyols include poly(propylene oxide) triols of weight average molecular weights of from 5,000 to 10,000 which are endcapped with ethylene oxide units resulting in primary hydroxyl (OH) end groups. These types of polymers can be made with $Zn_3[Co(CN)_6]_2$ catalysts as disclosed in an article by R. J. Herold and R. A. Livigni in "Advances in Chemistry" Series No. 128 (1973), p. 208, published by *The American Chemical Society*. The primary hydroxyl groups are thermally more stable than secondary hydroxyl groups before and after reaction with isocyanates and are more reactive than secondary hydroxyl groups with isocyanates. Therefore, polyols with 80% or more of their hydroxyls being primary hydroxyls are preferred. Polytetrahydrofuran (THF) diols showed lower performance and may be excluded from the adhesive. Polyols having principally ester linkages have lower hydrolytic stability and are therefore desirably excluded. Low molecular weight polyhydric alcohols may be included.

The low molecular weight polyhydric alcohols generally have from 2 to 15 carbon atoms with specific examples including ethylene glycol, 1,2-propylene glycol, 1,3-propylene glycol, 1,4-butane diol, 2,3-butane diol, 1,5-pentanediol, glycerol, sorbitol, pentaerythritol, dipropylene glycol, diethylene glycol, and the like. The amount of such polyhydric alcohols is generally from about 0 or 1 to about 40 parts by weight and preferably from about 0 or 1 to about 10 parts by weight based upon 100 parts by weight of the polyether polyol intermediate, the polyester polyol intermediate, or combinations thereof.

The polyisocyanates generally have the formula $R(NCO)_n$ where n is an integer of 2, 3 or 4 with approximately 2 being preferred or oligomeric reaction products from these isocyanates. Since combinations of various polyisocyanates can be utilized, the average number of isocyanate groups per polyisocyanate can vary and often is not an integer. R can be a hydrocarbyl of the aliphatic type having from about 2 to about 20 carbon atoms with from about 6 to about 15 carbon atoms being preferred, an aromatic type or combinations of aromatic and aliphatic moieties within the same molecule including an alkyl substituted aromatic types having from about 6 to about 22 carbon atoms with from about 6 to about 18 carbon atoms being preferred, or combinations thereof. Aromatic diisocyanates (i.e., where an NCO group is attached to an aromatic ring) are more desirable since the aliphatic diisocyanates generally react too slow. Examples of suitable polyisocyanates include 1,6-diisocyanato hexane, 2,2,4- and/or 2,4,4-trimethyl hexamethylene diisocyanate, p- and m-tetramethyl xylene diisocyanate, dicyclohexyl-methane-4,4'-diisocyanate (hydrogenated MDI), diphenyl methane-4,4'-diisocyanate (MDI), p- and m-phenylene diisocyanate, 2,4- and/or 2,6-toluene diisocyanate (TDI), durene-1,4-diisocyanate, isophorone diisocyanate, isopropylene-bis-(p-phenyl isocyanate) and sulfone-bis-(p-phenyl isocyanate). Also useful are diisocyanates prepared by capping low molecular weight, that is less than 300, diols, ester diols or diamines with diisocyanates, such as the reaction products of one mole of 1,4-butanediol or bis-(4-hydroxybutyl)-succinate (molecular weight=262) with two moles of hexamethylene diisocyanate. Any combination of diisocyanates can also be employed. Combinations of slower reacting aliphatic with faster reacting aromatic diisocyanates can be used. Examples of still other isocyanates include 1,5-naphthalenediisocyanate, cumene-2,4-diisocyanate, 4-methoxy- 1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 4,4'-diphenyldiisocyanate, 4,6-dimethyl-1,3-phenylenediisocyanate, 1,10-anthracenediisocyanate, 4,40 -diisocyanatodibenzyl, 3,3-dimethyl-4,4'-diisocyanatodiphenylmethane, 2,6-dimethyl-4,4'-diisocyanatodiphenyl and others and mixtures of the same. The various diphenylmethane diisocyanates (MDI) and mixtures of MDI with polymeric MDI having an average isocyanate functionality of from about 2 to about 3.2 are preferred.

Numerous fillers can be utilized in the prepolymer component. The fillers are generally mineral (inorganic), and in a powdery form and serve to adjust the urethane prepolymer adhesive component viscosity as well as to lower the cost thereof. The fillers can at times impart improved adhesion. Examples of specific fillers include ground mica, talc, kaolin clay, calcium carbonate, calcium sulfite, colloidal silica, wollastonite, ballotini, hollow glass microspheres, glass, carbon and graphite fibers, various metallic oxides such as zinc, titanium, zirconium, and the like, ground quartz, various metallic silicates, metallic powders such as lead, aluminum, bronze, and the like. A preferred filler is talc. The amount of filler is generally an effective amount to produce a viscosity so that the prepolymer component can be readily pumped through processing equipment such as adhesive meter-mixing machines. Such an effective amount is usually from about 5 to about 100 parts by weight and preferably from about 20 to about 50 parts by weight per 100 parts by weight of the prepolymer.

The curative component comprises one of the powdered curatives and optionally fillers and drying agents. The curatives may be cyanoguanidine, melamine or mono or dialkyl and/or mono or diphenyl substituted cyanoguanidine. The alkyl substituents may be linear or branched with up to 8 carbon atoms and desirably up to 3 carbon atoms.

The drying agents are used to absorb traces of moisture from the reactants. One particularly effective agent is dry ground molecular sieves. Molecular sieves with from about 3 to 5 Å pores are preferred, with 4 Å pores being most preferred. The drying agent may be present in amounts up to the amount of curative.

The amount of curative is desirably from about 1 to 20 parts by weight per 100 parts by weight of the prepolymer, more desirably from about 3 to 15 parts by weight, and preferably from about 4 to 11 parts by weight. Another way to express the amount of curative is the ratio of the number of NCO groups in the prepolymer to the number of NH or $NH_2$ groups in the curative. Assuming the cyanoguandine has 2 $NH_2$ groups per molecule, this ratio may desirably be from 1.2 to 2.2 and more desirably is from 1.4 to 1.9.

Curing with the preferred dicyanoguanidine (DICY) is generally slow and incomplete at 100° C. At 125° C. the adhesive compositions are desirably solids in from about 6 to 10 minutes, depending on particle size and the amount of DICY. At 150° C., the adhesives desirably cure into solids in 0 to 10 minutes and more desirably in less than 3 or 5 minutes. The curatives desirably cure into solids or gel in these times to form a structural bond so the adhered parts can be further handled and processed. Post cure of the adhesives for longer times and/or at higher temperatures is desirable.

The NCO/DICY reaction was studied by IR monitoring using a model system of m-tolylisocyanate/Dihard SF; NCO/(NH) of approximately 1.36. After one hour at 150° C., the DICY was completely reacted and the residual NCO was very low. All the nitrile groups of DICY were consumed yielding symmetrical triazine rings via trimerizaiton of the CN groups; also biuret type moieties were formed. It is postulated that the following structure is formed Catalysts for the curing reaction can be used and are typically tertiary amines, such as triethylene diamine (DABCO; Air Products), 1,8-diazabicyclo [5,4,0]-undec-7-ene, dimethylbenzamine; imidazole, imidazole derivatives, e.g., 2-ethyl-or 2-ethyl-4-methyl-imidazole; quaternary ammonium salts, e.g., the reaction products of trimethylamine/propylene oxide and organic acids, typically 2-ethyl-hexanoic acid or formic acid (sold by Air Products under the brand names: DABCO TMR-1 to 4); organic tin compounds such as dilauryl-tin-dioctoate (T-12), stannous dioctoate (T-9), or sulfur containing tin compounds (T-5), etc. The catalysts have a tendency to reduce shelf-life of the one component adhesive.

Adhesion promoters discussed in other polyurethane patents may be included but are not required. These types of materials include Vercol™ 82, a propylated diphosphate with 2-OH groups/molecule, castor oil and Caytur™ 21, a methylene dianiline/NaCl complex in dioctyl phthalate available from Uniroyal Chemical which gives improved cohesive/adhesive strength in adhesives with lower NCO:OH ratios in the prepolymer. Caytur™ 21 also accelerates the cure with cyanoguanidine, its derivatives, or melamine.

Antioxidants for the polyols and polyurethanes may be beneficially incorporated into the adhesive, hindered phenolic antioxidants such as Irganox™ 1035 from Ciba Geigy function well. They may be used in amounts up to 1 or 2 parts by weight per 100 parts by weight of the prepolymer.

If it is desired that the polyurethane adhesive composition of the present invention have a color or hue, any conventional pigment or dye can be utilized in conventional amounts. Hence, any pigment known to the art and to the literature can be utilized as for example titanium dioxide, iron oxide, carbon black, and the like, as well as various dyes provided that they do not interfere with the urethane reaction.

One-package as used means a composition combined in one undivided container that is useful for its intended purpose without requiring further additions to perform its function. Thus, a one-package adhesive contains the curatives, etc. within the blended composition. Storage stability as used means the composition does not crosslink to any considerable extent and remains usable under the specified conditions for the specified time. Alternative terms for a one-package are one component, one-pack, and one-part.

The one-package adhesive may be prepared in a variety of ways. One preferred way is to mix (or blend) the polyols and a portion of the mineral fillers at an elevated temperature under vacuum to remove residual moisture. When a low moisture content is produced, the polyisocyanate is added and allowed to react with the polyol to form the prepolymer. The antioxidants may be beneficially present during this reaction. The prepolymer can then be cooled and mixed with the DICY, molecular sieves, and any thickener.

The substrate for the adhesive may be any structural part. Preferred substrates are fiber reinforced thermoset plastic parts (FRP) and metal brackets for said plastic parts. Desirably, the thermoset plastic parts are unsaturated polyesters cured with ethylenically unsaturated monomers or vinyl ester resins cured with the same. Desirably, the thermoset plastic parts have at least 10, 20, or 30 wt. % fiber reinforcement. Most desirably the fiber is fiberglass.

Structural adhesives for fiber reinforced plastic parts (FRP) are often exposed to high temperatures during baking or curing operations of the coatings applied to the parts. These operations are typically from about 150° C. to 225° C., and desirably from about 200° to 210° C. The baking cycles are usually from about 10 minutes to 2 hours, and desirably from 30 minutes to one hour. If a production line is stopped with parts in the oven, the baking can last substantially longer.

Structural adhesives for parts which will be baked as recited above need not be fully cured prior to said baking processes. It is desirable that the adhesive bond to the substrate and cohesive strength of the adhesive remain constant or increase during baking for the above-recited times and temperatures rather than decrease. Thus, the cross-peel test prior to post-curing or oven baking may only need a value of at least 0.1, 5, or 10 psi ($0.7 \times 10^{-3}$ MPa, $34.5 \times 10^{-3}$ or $69 \times 10^{-3}$) to hold the two or more substrates together until the baking of coatings further cures the adhesive composition.

The urethane adhesive compositions of the present invention are suitable for application to non-treated, surface-treatment free, and/or primer-free substrate surfaces such as FRP substrates, metal substrates, plastic substrates, and the like. The adhesive of the present invention can thus be utilized to bond at least two such substrates together. An area of particular use is in the automotive industry wherein FRP structural components are bonded to automobile body panels, such as hoods, doors, fenders, front ends, trunk lids, and the like. It is an improvement over other urethane-based adhesives (one package or two packages) in that it requires no metered mixing equipment at the bond site, has good shelf life, has fast solidification time, and does not require expensive blocking agents that are released to contaminate the adhesive or the environment after their blocking function is accomplished.

The invention will be better understood by reference to the following examples.

EXAMPLES

Examples 1–6

Polyurethane Base I is prepared as follows. In a reactor are mixed and heated to ~110° C. under vacuum, 26.7 parts of a liquid polypropylene oxide triol, which is endcapped with ethylene oxide ($\overline{M}w$~6,000), 0.2 parts Irganox 1035 (a hindered phenol type antioxidant from Ciba-Geigy), 25 parts talc 4416 (Whittaker, Clark and Daniels) and 1.1 parts Aerosol R-202 (hydrophobic silica from Degussa). When a water content of $\leq 0.09\%$ is reached (by Karl Fischer analysis), the mixture is cooled to ~70° C. and 47.6 parts Isonate 2191 (a liquid aromatic isocyanate; average functionality ~2.2; ~7.15 meq NCO/g; generally a liquid isocyanate made from MDI or oligomers thereof, with a slight modification so that the product is a liquid at room temperature (available from Dow Chemical Co.)) is added and the mixture is reacted for ~1 hour at ~85° C. The final isocyanate content of the mixture is ~3.2 meq. NCO/g. The molar charge ratio of diisocyanate/polyol was NCO/OH ~26/1.

Adhesive Formulation 100 g Polyurethane Base I (above)

5 g of Molecular Sieves with 4 Å pores 7.5 or 10 g DICY (varying particle size, as listed in Table I)

~4 g Fumed Silica

The components are mixed in a high speed mixer (Whip Mix™; Whip Mix Corp.) under vacuum for a few minutes until a smooth paste is obtained. A portion of the mixture is stored in a closed jar under dry N₂ for shelf-life determinations. The initial viscosity data are listed in Table I. During storage, the viscosity increased somewhat, but the pastes did not turn solid or become unusable. The shelf-life appears to be at least 4 months at room temperature.

Cure rates were determined in aluminum dishes on a hot plate at both ~125° C. and 150° C., as shown in Table I. Generally, gelation started in about 1 to 3 minutes. Finer particle size and higher DICY level mixtures were found to gel and cure faster, especially at lower temperatures.

Cross-Peel Test

Two 1-inch wide×4-inch long fiber reinforced thermoset plastic (FRP) test coupons are bonded together at a right angle with adhesive forming a 1×1 inch (0.0254×0.0254 m) bonded area (containing small glass beads of about 0.030 inch (0.076 cm) diameter used as spacers). Curing was typically done for ~10 minutes at 125° C. under sufficient pressure to exude excess adhesive and then ~1 hour of post-cure at 150° C. in an oven (initial cure may also be done at 150° C. in shorter times, e.g., 5 minutes). In a testing device, the bonded coupons are mechanically separated by applying a peel force. The maximum force of separation is recorded as total force divided by the 1×1 inch area. The separated coupons are examined visually and the nature of failure is estimated in percent substrate failure (% SF), cohesive failure (% CF) and adhesive failure (% AF). The failure mode is the most important criterion in assessing the quality of the bond formed and consequently of the quality of the adhesive. A 100% SF is most desirable; least desirable is adhesive failure, which is indicative of poor contact between adhesive and substrate. Thus, Examples 5 and 6 are rated the best of the series. When a large particle size DICY 100 with 98% of its particles of a size <40 μm was used in Example 1, a large amount of adhesive and cohesive failures were observed. In Example 2 the amount of the DICY (same particle size) was increased, but the adhesive and cohesive failures were still unacceptably high. Examples 3 and 4 show that the use of a smaller particle size DICY 100S with 98% of its particles of a size <10 μm significantly reduced the amount of cohesive and adhesive failures. Examples 5 and 6 with 98% of their DICY particles <6 μm showed further reductions in cohesive and adhesive failure.

Examples 7–11

This series of experiments demonstrates that a polyurethane (P.U.) prepolymer with a lower free isocyanate content, using a lower NCO/OH ratio in its preparation from diisocyanates and polyols, was inferior to the one made with an NCO/OH ratio of 26 (Examples 1–6).

A P.U. Base II was made in similar fashion, as described in Examples 1–6, but much less diisocyanate was used. The NCO/OH charge ratio was ~15; the final isocyanate content was 2.09 meq/g. Another difference was that the polyol used in Base II had less primary OH end groups (~85%) vs. ~100% for the polyol in Base I. The residual (~15%) of the OH groups in Base II were secondary hydroxyls. The NCO:OH ratio was responsible for the increased occurrence of cohesive failure. The type (primary or secondary) of hydroxyl group affected the heat aging results. Urethanes from polyols having primary hydroxyl groups have better heat aging properties.

Test results are shown in Table II. In the cross-peel test, cohesive failure was predominant, while substrate failure was very low.

Examples 12–15

Adhesive formulations and lap-shear test results are shown in Table III. Examples 12 and 13 have the same formulations as Examples 5 and 6 (Table I). Example 14 has 8 parts DICY-SF and 4 parts of castor oil adsorbed on 3 Å molecular sieves as modifier per 100 parts of P.U. Base I. Example 15 contains a mixture of 87.5 parts P.U. Base I and 12.5 parts of a poly-(tetramethylene oxide) diol (poly-THF diol) endcapped with toluene diisocyanate (TDI) and 7 parts DICY-SF per 100 parts P.U. Base II/poly-THF-TDI mixture. The poly-THF diol endcapped with TDI had an isocyanate content of 1.9 meq/g.

The age of the adhesives tested was 3 days or 39 days for Examples 12–14 and 3 days or 46 days for Example 15. The lap shear data in Table III using ASTM D3163-92 shows that there is no decline in adhesive performance with age. Good heat age resistance (30 min. and 60 min. at 200° C.) is exhibited by all samples except for Example 15. Example 15 demonstrates the importance of the polyols selected for the P.U. base. An adhesive (not included in the table) with 25% poly-THF/TDI/75% P.U. Base I did not cure properly; it was still cheesy after ~½ hour at 150° C. and thus not useful as a structural adhesive. The hydroxyls of the poly-THF/TDI had 100% primary hydroxyl groups and still had poor heat aging. The use of TDI, which has a sterically hindered NCO group, as a substitute for some of the MDI is believed to be a probable cause of the slow curing process.

Figure 1:
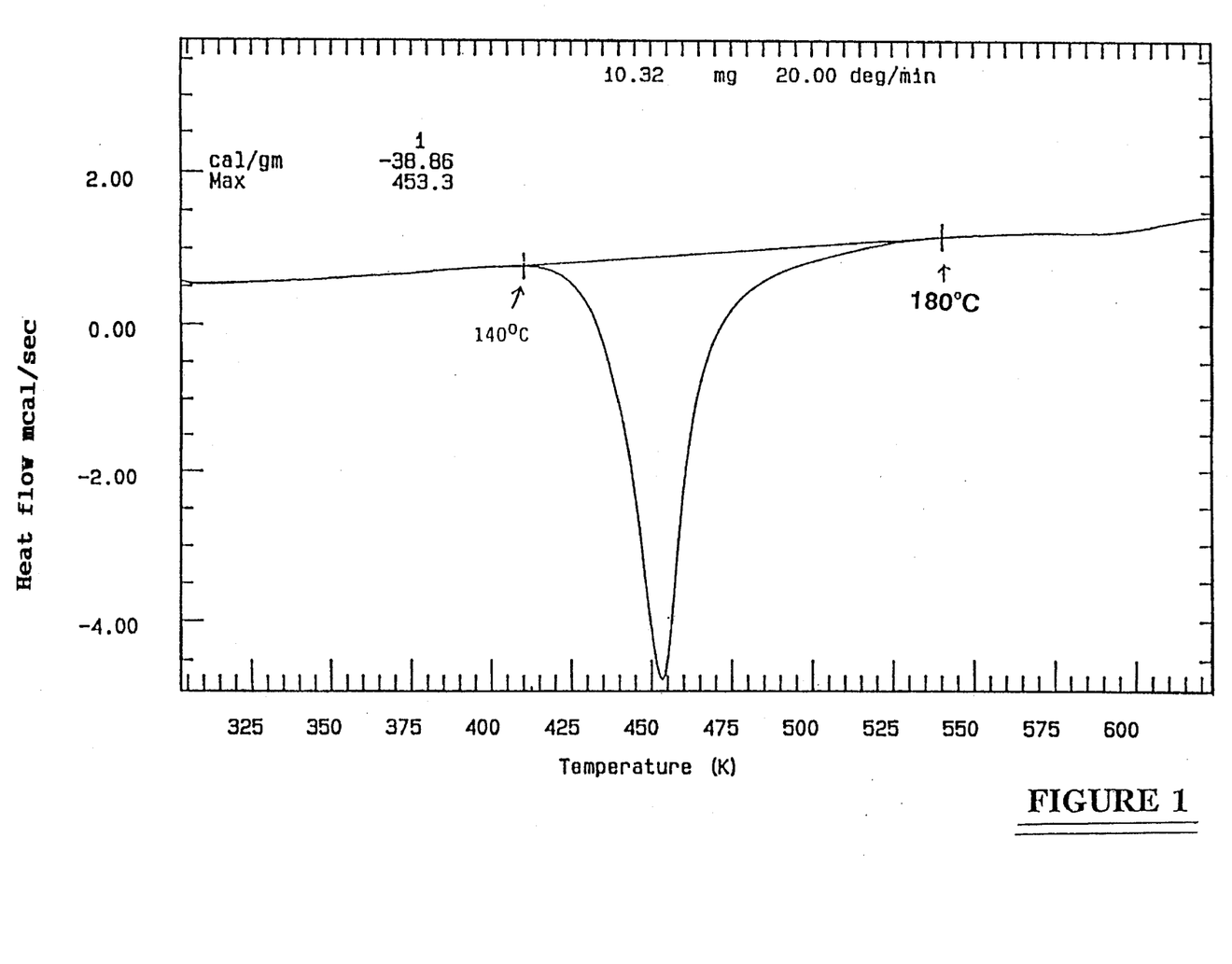
Figure 2:
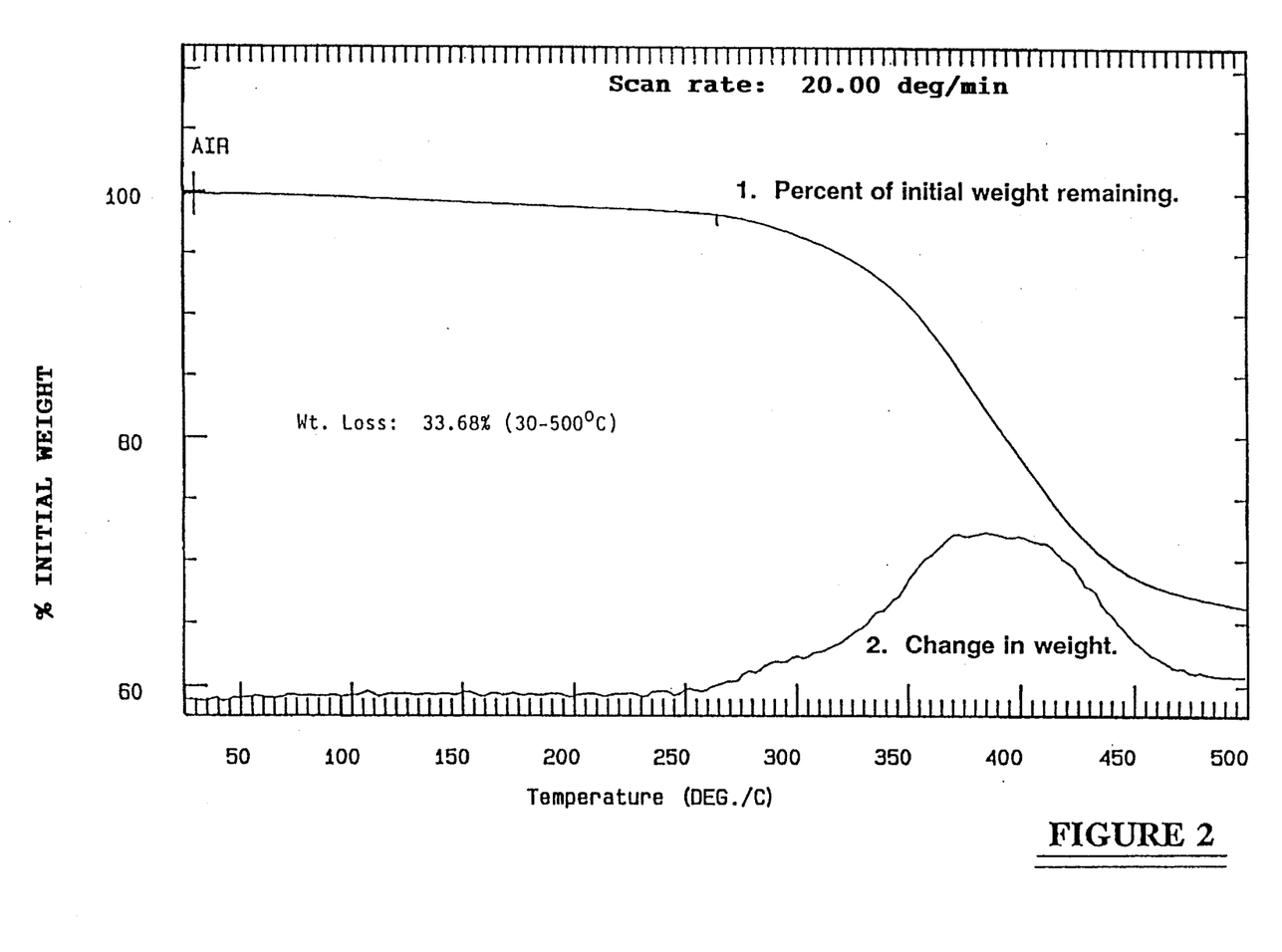
Figure 3:
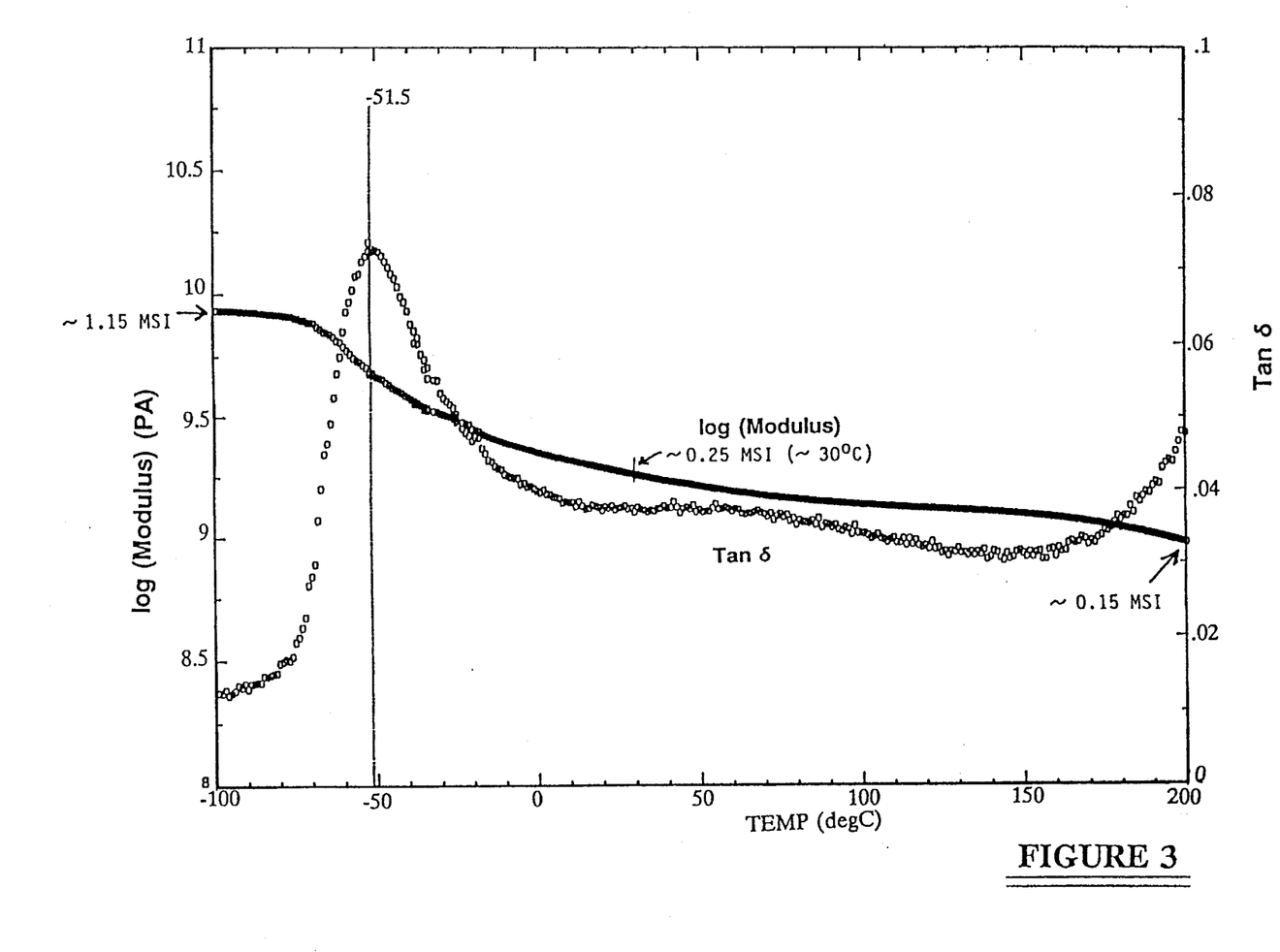

A DSC scan (FIG. 1) of uncured formulation 12 indicates a strong cure exotherm, starting at ~140° C. with a peak at ~180° C. A TGA scan (FIG. 2) of the cured material shows good thermal stability in air up to about 250° C. A DMTA scan (FIG. 3) of the cured material of Example 13 exhibits a strong tan δ transition (~glass transition temperature (Tg)) at −51.5° C., indicative of good low temperature toughness; and shows the storage modulus retention is quite good up to ~200° C. indicative of good high temperature strength of the adhesive bond.

TABLE I

ONE-PACK ADHESIVE: POLYURETHANE BASE I/DICY PARTICLE SIZE VARIATIONS
Constant: 100 g P.U. Base I (3.2 meq. NCO/g) (NCO:OH ratio 26:1)
5 g 4Å molecular Sieves
4 g Fumed Silica

| Example No. | 1 | 2 | 3 | 4 | 5 | 6 |
|---|---|---|---|---|---|---|
| DICY 100[1] | 7.5 | 10 | — | — | — | — |
| DICY 100 S[1] | — | — | 7.5 | 10 | — | — |
| DICY 100 SF[1] | — | — | — | — | 7.5 | 10 |
| meq. $NH_2$[2] in DICY | 173 | 230 | 173 | 230 | 170 | 226 |
| NCO/$NH_2$ | 1.8 | 1.4 | 1.8 | 1.4 | 1.9 | 1.4 |
| Viscosity ($10^6$ cps) Initial | 1.5 | 1.8 | 1.7 | 1.6 | 1.8 | 2.0 |
| 125° C. Cure (min.) | ~10(+) | ~10 | ~10 | 7–8 | 10 | 6 |
| 150° C. Cure 4 (min.) | 4 | 5 | 4 | 3–4 | 4–5 | 5 |
| Cross Peel[3] (psi ± 1 std. dev.) | (153 ± 12) | (181 ± 7) | (149 ± 7) | (149 ± 7) | (153 ± 12) | (153 ± 12) |
| MPa ± 1 std. dev. | 1.06 ± 0.08 | 1.25 ± 0.05 | 1.03 ± 0.05 | 1.03 ± 0.05 | 1.06 ± 0.08 | 1.06 ± 0.08 |
| % SF | 87 | 62 | 92 | 93 | 97 | 97 |

TABLE I-continued

ONE-PACK ADHESIVE: POLYURETHANE BASE I/DICY PARTICLE SIZE VARIATIONS
Constant: 100 g P.U. Base I (3.2 meq. NCO/g) (NCO:OH ratio 26:1)
5 g 4Å molecular Sieves
4 g Fumed Silica

| Example No. | 1 | 2 | 3 | 4 | 5 | 6 |
|---|---|---|---|---|---|---|
| % CF | 8 | 25 | 7 | 5 | 3 | 2 |
| % AF | 5 | 13 | 1 | 2 | 0 | 1 |

[1]Dyhard (SKW) min. 95–97% DICY; (100) particle size 98% < 40 μm; (100S) 98% < 10 μm; (100SF) 98% < 6 μm.

[2]~23 meq. $NH_2$/g for 100 and 100 S; ~22.6 meq. $NH_2$/g for 100 SF (calculations based on formula given by SKW).

[3]Cure: 10 min. 125° C. + 1 hr. 150° C. post-cure.

[4]Cure times at 150° C. may be further reduced to less than 3 min. by adding catalysts.

TABLE II

ONE-PACK ADHESIVE: POLYURETHANE BASE II/DICY AMOUNT VARIATIONS
Constant: 100 g P.U. Base II (2.09 meq. NCO/g) (NCO:OH ratio approximately (15:1)
5 g 4Å Molecular Sieves
4 g Fumed Silica

| Example No. | 7 | 8 | 9 | 10 | 11 |
|---|---|---|---|---|---|
| DICY[1] (g) | 6 | 7 | 8 | 9 | 10 |
| meq. $NH_2$[2] | 140 | 162 | 185 | 208 | 230 |
| NCO/$NH_2$ | 1.5 | 1.3 | 1.1 | 1.0 | 0.9 |
| Viscosity ($10^6$ cps) Initial | 1.2 | 1.4 | 1.5 | 1.5 | 1.3 |
| 150° C. Cure[3] (min.) | 10 | 4–5 | 3–5 | 2 | 2 |
| Cross Peel[4] (psi ± 1 std. dev.) | (149 ± 14) | (157 ± 14) | (177 ± 0) | (161 ± 14) | (161 ± 18) |
| Mpa ± 1 std. dev. | 1.03 ± 0.10 | 1.08 ± 0.10 | 1.22 ± 0.00 | 1.11 ± 0.10 | 1.11 ± 0.12 |
| % SF | 17 | 10 | 12 | 16 | 2 |
| % CF | 83 | 90 | 88 | 84 | 98 |
| % AF | 0 | 0 | 0 | 0 | 0 |

[1]Dyhard 100 S (≧97.3% DICY; particle size 98% < 10 μm).
[2]~23 meq. $NH_2$/g of DICY 1calculated (based on chemical structure).
[3]125° C. cures much slower > 30 min. for all runs.
[4]Cure: 10 min. 125° C. + 1 hr. 150° C. post-cure.

TABLE III

Lap-Shear Test Results FRP/FRP
Adhesive: P.U. Base I (3.2 meq NCO/g) (100 g)
4Å Molecular Sieves (~5 g), Fumed Silica (~4 g)
Other Ingredients as Listed

| Example No.: | 12 | | 13 | | 14[1] | | 15[2] | |
|---|---|---|---|---|---|---|---|---|
| DICY (SF)[3] (curative) | 7.5 g | | 10 g | | 8 g | | 7 g | |
| Ratio NCO/$NH_2$+OH | 1.9 | | 1.4 | | 1.2 | | 1.9 | |
| Lap Shear Test of Aged Samples Age of Adhesive (days) RT aged/RT tested | 3 | 39 | 3 | 39 | 3 | 39 | 3 | 46 |
| (psi ± 1 std. dev.) | (502 ± 19) | (527 ± 34) | (462 ± 50) | (513 ± 12) | (502 ± 16) | (508 ± 30) | (598 ± 4) | (549 ± 28) |
| MPa ± 1 std. dev. | 3.46 ± 0.13 | 3.63 ± 0.23 | 3.19 ± 0.34 | 3.54 ± 0.08 | 3.46 ± 0.11 | 3.50 ± 0.21 | 4.12 ± 0.03 | 3.79 ± 0.19 |
| SF/CF/AF (%) | 100/0/0 | 100/0/0 | 100/0/0 | 100/0/0 | 100/0/0 | 100/0/0 | 100/0/0 | 100/0/0 |
| RT aged/82° C. tested | | | | | | | | |

TABLE III-continued

Lap-Shear Test Results FRP/FRP
Adhesive: P.U. Base I (3.2 meq NCO/g) (100 g)
4Å Molecular Sieves (~5 g), Fumed Silica (~4 g)
Other Ingredients as Listed

| Example No.: | 12 | | 13 | | 14[1] | | 15[2] | |
|---|---|---|---|---|---|---|---|---|
| (psi ± 1 std. dev.) | (377 ± 20) | (388 ± 22) | (361 ± 35) | (359 ± 22) | (373 ± 15) | (395 ± 26) | (405 ± 34) | (410 ± 18) |
| MPa ± 1 std. dev. | 2.60 ± 0.14 | 2.68 ± 0.15 | 2.49 ± 0.24 | 2.48 ± 0.13 | 2.57 ± 0.10 | 2.72 ± 0.18 | 2.79 ± 0.23 | 2.83 ± 0.12 |
| SF/CF/AF (%) | 100/0/0 | 98/0/2 | 97/0/3 | 96/0/4 | 100/0/0 | 100/0/0 | 100/0/0 | 100/0/0 |
| 30 min. H.Ag[4]/82° C. tested | | | | | | | | |
| (psi ± 1 std. dev.) | (383 ± 29) | not tested | (341 ± 51) | not tested | (373 ± 16) | not tested | (148 ± 11) | not tested |
| MPa ± 1 std. dev. | 2.64 ± 0.20 | | 2.35 ± 0.35 | | 2.57 ± 0.11 | | 1.02 ± 0.08 | |
| SF/CF/F (%) | 95/2/3 | | 96/1/3 | | 100/0/0 | | 0/81/19 | |
| 60 min. H.Ag[4]/82° C. tested | | | | | | | | |
| (psi ± 1 std. dev.) | (395 ± 25) | not tested | (343 ± 45) | not tested | (376 ± 16) | not tested | (238 ± 16) | not tested |
| MPa ± 1 std. dev. | 2.72 ± 0.17 | | 2.37 ± 0.31 | | 2.59 ± 0.11 | | 1.64 ± 0.11 | |
| SF/CF/AF (%) | 100/0/0 | | 96/1/3 | | 99/0/1 | | 0/77/23 | |

[1]Contains ~4 g Castor Oil/3A Molecular Sieves
[2]Instead of the adhesive base having 100 g of P.U. Base I, it has 87.5 g P.U. Base I and 12.5 g of poly-THF diol capped with toluene diisocyanate. (The capped poly-THF did have 1.9 meq. NCO/g).
[3]Dyhard 100 SF (particle size ~ 6 μm).
[4]Heat aged for 1 hr. at 200° C.; tested at 82° C.

While in accordance with the Patent Statutes, the best mode and preferred embodiment has been set forth, the scope of the invention is not limited thereto, but rather by the scope of the attached claims.

What is claimed is:

1. An adhesive composition comprising:
   a) a prepolymer comprising the reaction product of one or more polyols with one or more polyisocyanates wherein the NCO:OH ratio is from about 10:1 to 30:1,
   b) a curative comprising melamine and/or cyanoguanidine having from 0 to 2 substituents which are independently alkyls of 1 to 8 carbon atoms or phenyl, said melamine and/or cyanoguanidine of the curative having reactive $NH_2$ groups, being in particle form, and having at least 98 wt. % of its particles of a particle diameter of less than 25 μm, and
   c) one or more mineral fillers
   wherein the ratio of the NCO groups of the prepolymer to the $NH_2$ groups of the curative is from 1.2 to 2.2 and wherein the adhesive composition has the capacity to form a structural bond between two parts in 10 minutes or less at 150° C.

2. An adhesive composition according to claim 1, wherein the prepolymer component is about 80 wt. % or more of the adhesive and said curative comprises cyanoguanidine having neither alkyl nor phenyl substituents and having 98 wt. % of its particles less than 15 μm in diameter.

3. An adhesive composition according to claim 1, wherein said curative comprises cyanoguanidine having neither alkyl nor phenyl substituents.

4. An adhesive composition according to claim 1, wherein said curative comprises melamine.

5. An adhesive composition according to claim 1, wherein said curative comprises a mono or dialkyl substituted cyanoguanidine.

6. An adhesive composition according to claim 3, wherein the one or more polyols have number average molecular weights from about 2,000 to 8,000 and have an average functionality above 2, wherein said mineral fillers include talc, wherein the cure time to form an initial structural bond is about 5 minutes or less at a cure temperature of 150° C., and wherein at least 98 wt. % of said particles are of a diameter of less than 15 μm.

7. An adhesive composition according to claim 6, wherein said one or more polyols are polyols having greater than 80 number percent of their hydroxyl groups being primary hydroxyl groups.

8. An adhesive composition according to claim 7, wherein the polyisocyanates have NCO groups, wherein said NCO groups are pendant to aromatic rings in the polyisocyanate, wherein the ratio of NCO groups in the prepolymer to $NH_2$ groups in the curative are from about 1.4 to 1.9 and wherein the curative has at least 98 wt. % of its particles of diameter less than 10 μm.

9. An adhesive composition according to claim 8, wherein said one or more polyols are poly(alkylene oxide) based polymers, wherein the alkylene unit has from 1 to 3 carbon atoms, and wherein the curative has at least 98 wt. % of its particles of diameter less than 6 μm.

10. A laminate comprising two or more substrates adhered by said adhesive composition according to claim 1.

11. A laminate according to claim 10, wherein at least one of the substrates is a fiber reinforced thermoset plastic.

12. A laminate according to claim 11, wherein the at least one fiber reinforced thermoset plastic has a primerless surface and said adhesive is applied to said primerless surface.

13. A laminate comprising two or more substrates adhered by said adhesive composition according to claim 6.

14. A laminate according to claim 13, wherein at least one of the substrates is a fiber reinforced thermoset plastic.

15. A laminate according to claim 14, wherein said at least one fiber reinforced thermoset plastic substrate has at least one primerless surface and wherein said adhesive composition is applied to one of said at least one primerless surfaces.

16. A laminate comprising two or more substrates adhered by said adhesive composition according to claim 9, wherein at least one of the substrates is a molded fiber reinforced thermoset polyester part.

17. In a process comprising forming a urethane-based structural adhesive from isocyanate-terminated prepolymers and one or more curatives, wherein said isocyanate terminated prepolymers are the reaction product of one or more polyols and one or more polyisocyanates reacted at an NCO:OH ratio of from 10:1 to 30:1, the improvement wherein said one or more curatives comprise a powdered curative selected from cyanoguanidine, mono or di alkyl and/or phenyl substituted cyanoguanidine, melamine or mixtures thereof; and wherein said powdered curative has a particle size distribution such that 98 wt. % of said powdered curative has a particle diameter of less than 25 μm.

18. In a process according to claim 17, wherein said powdered curative comprises said cyanoguanidine, and where the process includes curing the adhesive at temperatures of 125° C. or higher.

19. In a process according to claim 18, wherein said powdered curative consists essentially of cyanoguanidine with neither alkyl nor phenyl substituents and said powdered curatives are present in an amount of from 1 to 20 parts by wt. per 100 parts by wt. of said prepolymers and wherein the isocyanate terminated prepolymers are made from polyols and aromatic polyisocyanates.

* * * * *